(12) United States Patent
Xiong et al.

(10) Patent No.: US 11,306,860 B2
(45) Date of Patent: Apr. 19, 2022

(54) PIPELINE DEFORMATION DETECTION PIG

(71) Applicant: CHINA UNIVERSITY OF PETROLEUM-BEIJING, Beijing (CN)

(72) Inventors: Yi Xiong, Beijing (CN); Da Yu, Beijing (CN); Kunpeng Zhao, Beijing (CN)

(73) Assignee: CHINA UNIVERSITY OF PETROLEUM-BEIJING, Beijing (CN)

( * ) Notice: Subject to any disclaimer, the term of this patent is extended or adjusted under 35 U.S.C. 154(b) by 229 days.

(21) Appl. No.: 16/870,830

(22) Filed: May 8, 2020

(65) Prior Publication Data

US 2020/0278069 A1 Sep. 3, 2020

Related U.S. Application Data

(63) Continuation of application No. PCT/CN2018/105296, filed on Sep. 12, 2018.

(30) Foreign Application Priority Data

Nov. 10, 2017 (CN) .......................... 201711106329.6

(51) Int. Cl.
*G01B 21/32* (2006.01)
*F16L 55/28* (2006.01)
*F16L 101/30* (2006.01)

(52) U.S. Cl.
CPC .............. *F16L 55/28* (2013.01); *G01B 21/32* (2013.01); *F16L 2101/30* (2013.01)

(58) Field of Classification Search
CPC .................................. F16L 55/28; G01B 21/32
(Continued)

(56) References Cited

U.S. PATENT DOCUMENTS 4,443,948 A * 4/1984 Reeves ................... G01B 7/287
33/544.3
4,780,962 A * 11/1988 Smith .................... G01B 5/207
33/304
(Continued)

FOREIGN PATENT DOCUMENTS

CN 1560564 A 1/2005
CN 101544042 A 9/2009
(Continued)

OTHER PUBLICATIONS

International search report.
(Continued)

*Primary Examiner* — George B Bennett
(74) *Attorney, Agent, or Firm* — J.C. Patents

(57) ABSTRACT

The disclosure provides a pipeline deformation detection PIG, including: a detection body and a foam body; the detection body is arranged in the foam body, and the detection body includes: a pressure sensing element; and the pressure sensing element includes: a pressure sensor and a pressure coupling unit. The detection body of the pipeline deformation detection PIG of the present disclosure is provided in the foam body, the inner side surface of the pressure coupling unit is in contact with the force receiving surface of the pressure sensor, and the outer side surface is in contact with the inner wall of the pipeline to be detected, the pressure coupling unit can translate the pipeline deforms into pressure according to coupling deformation, and meanwhile solve the stuck problem of the existing detection PIG in a large deformation pipeline.

10 Claims, 5 Drawing Sheets

(58) Field of Classification Search
USPC .................................................. 33/544, 544.5
See application file for complete search history.

(56) References Cited

U.S. PATENT DOCUMENTS

| | | | | |
|---|---|---|---|---|
| 4,953,412 A * | 9/1990 | Rosenberg | ............. | G01B 5/207 73/866.5 |
| 5,088,336 A * | 2/1992 | Rosenberg | ............. | G01B 5/207 33/544 |
| 7,000,280 B1 * | 2/2006 | Knapp | ................. | B08B 9/0557 15/104.061 |
| 7,421,914 B2 * | 9/2008 | Stanley | ................... | G01B 5/12 33/544.3 |
| 9,353,902 B2 * | 5/2016 | Early | ...................... | F16L 55/34 |
| 2007/0174983 A1 * | 8/2007 | Smith | ................... | B08B 9/0551 15/104.061 |
| 2010/0277188 A1 | 11/2010 | Brusco et al. | | |
| 2011/0198075 A1 * | 8/2011 | Okada | ..................... | F16L 55/28 166/170 |
| 2012/0131758 A1 | 5/2012 | Bacon et al. | | |
| 2013/0174363 A1 | 7/2013 | Ullom | | |
| 2022/0026302 A1 * | 1/2022 | Hen | ......................... | E03F 7/02 |

FOREIGN PATENT DOCUMENTS

| | | |
|---|---|---|
| CN | 103185565 A | 7/2013 |
| CN | 103672291 A | 3/2014 |
| CN | 104646362 A | 5/2015 |
| CN | 205718816 U | 11/2016 |
| CN | 106225700 A | 12/2016 |
| CN | 106238416 A | 12/2016 |
| CN | 2897465 Y | 5/2017 |
| CN | 107061925 A | 8/2017 |
| CN | 107907095 A | 4/2018 |

OTHER PUBLICATIONS

Office Action of the prior Chinese application.
"An Overview on Domestic and Foreign Long Distance Pigging Technology".

* cited by examiner

PIPELINE DEFORMATION DETECTION PIG

CROSS-REFERENCE TO RELATED APPLICATIONS

This application is a continuation of International Application No. PCT/CN2018/105296, filed on Sep. 12, 2018, which claims the priority benefit of China Patent Application No. 201711106329.6, filed on Nov. 10, 2017. The contents of the above identified applications are incorporated herein by reference in their entireties.

TECHNICAL FIELD

The disclosure relates to the technical field of oil-gas pipeline detection, and in particular, to a pipeline deformation detection PIG (pipeline inspection gauge).

BACKGROUND

Pipelines are important facilities in the transportation of oil and natural gas, and they are widely laid in various land and marine environments in the world. During the long-term transportation of the pipeline, many factors such as earthquakes, construction, rain and snow, etc., will cause deformation of the pipeline to different degrees, such as: pipeline depression, bending, sinking, and elliptical deformation, etc., which will further lead to increased resistance to oil-gas transportation, increased transmission energy consumption, and reduced pipeline strength, thereby causing serious safety risks. Thus, deformation detection of oil-gas pipelines must be performed regularly.

In the prior art, a contact detection PIG is generally used for pipeline deformation detection. The contact detection PIG includes two cups and a detection mechanism in the middle of the two cups. The two cups are used to seal against the inner wall of the pipeline, generating a pressure difference between the front and back so as to move the PIG forward. The detection mechanism includes a rigid support and a sensing element disposed on the rigid support. The sensing element abuts against the inner wall of the pipeline so as to detect whether the pipeline is deformed.

However, when the pipeline is greatly deformed, the contact detection PIG is easily to be stuck and cannot move forward normally, which will affect the normal transportation of oil-gas and even cause safety accidents.

SUMMARY

The disclosure provides a pipeline deformation detection PIG to overcome the problem that the existing detection PIG is easily to be stuck in a large deformation pipeline.

The present disclosure provides a pipeline deformation detection PIG, including: a detection body and a foam body; the detection body is arranged in the foam body, and the detection body includes: a pressure sensing element; and the pressure sensing element includes: a pressure sensor and a pressure coupling unit; an inner side surface of the pressure coupling unit is in contact with a force receiving surface of the pressure sensor, and an outer side surface of the pressure coupling unit is configured to contact an inner wall of a pipeline to be detected.

In the pipeline deformation detection PIG provided by the present disclosure, the detection body is arranged in the foam body, the inner side surface of the pressure coupling unit is in contact with the force receiving surface of the pressure sensor, and the outer side surface of the pressure coupling body is configured to contact the inner wall of the pipeline to be detected, such that the pressure value of each radial section of the pipeline can be detected, the deformation detection of the entire circumferential direction of the pipeline can be realized. And the pressure coupling unit can deform under pressure as the pipeline deforms, which solves the problem that the existing detection PIG is easily to be stuck in a large deformation pipeline.

DESCRIPTION OF REFERENCE NUMERALS

Figure 1:
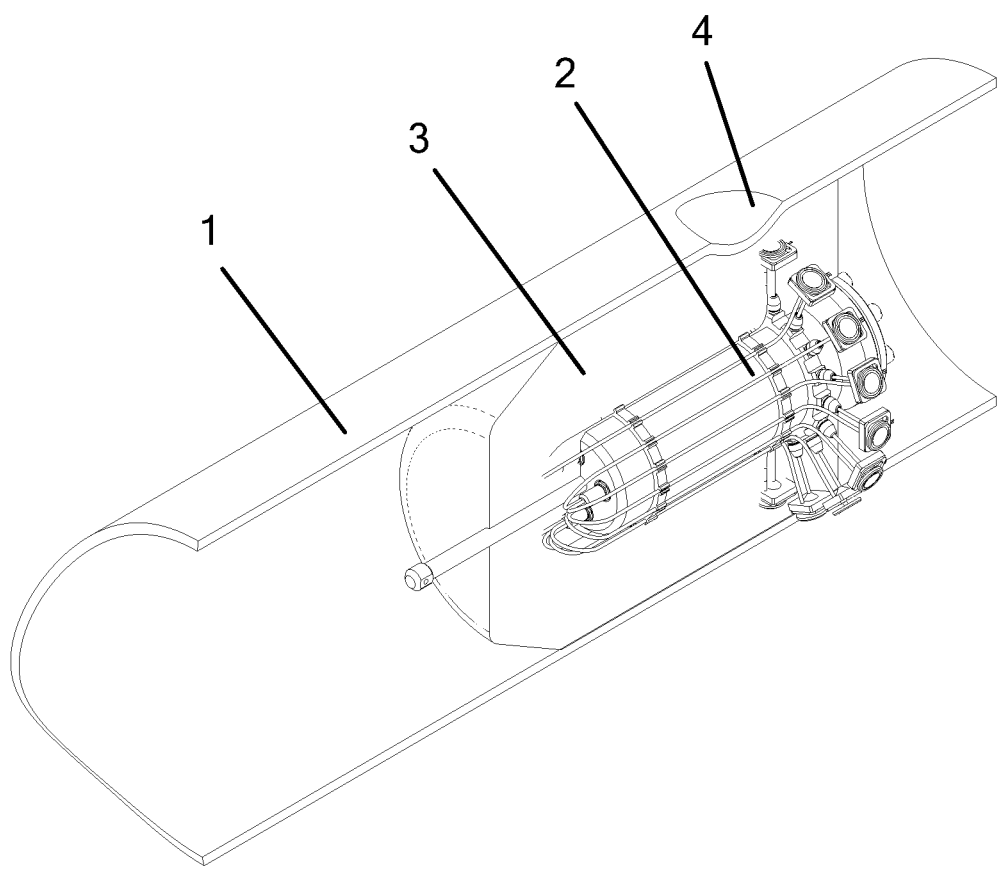
FIG. 1 is a schematic structural diagram of a pipeline deformation detection PIG according to an embodiment of the present disclosure.

| | |
|---|---|
| 1: pipeline to be detected; | 2: detection body; |
| 3: foam body; | 4: deformed area; |
| 20: chamber body; | 201: outer housing body; |
| 202: bottom cover; | 2021: bolt; |
| 203: pull rod; | 2031: mounting portion; |
| 204: sealing rubber sleeve; | 205: sealing joint; |
| 206: wire; | 207: snap ring; |
| 21: pressure sensing element; | 211: pressure sensor; |
| 2111: mounting frame; | 2111a: indenter; |
| 2111b: connecting column; | 2111c: frame; |
| 2112: strain gauge; | 212: pressure coupling unit; |
| 2121: pressure coupling body; | 2122: elastic member; |
| 213: tray; | 22: support component; |
| 221: cross clamp; | 2211: fixing portion; |
| 2212: abutting portion; | 2213: external thread portion; |
| 2214: clamping portion; | 222: tightening nut; |
| 2221: internal thread portion; | 2222: conical portion; |
| 223: support frame; | 224: fixing ring. |

DETAILED DESCRIPTION OF THE EMBODIMENTS

Hereinafter, embodiments of the present disclosure will be described in detail. Examples of the embodiments are shown in the accompanying drawings, wherein the same or similar reference numerals represent the same or similar elements or elements having the same or similar functions throughout. The embodiments described below with reference to the accompanying drawings are exemplary and are intended to explain the present disclosure, but should not be construed as a limitation of the present disclosure.

Figure 2:
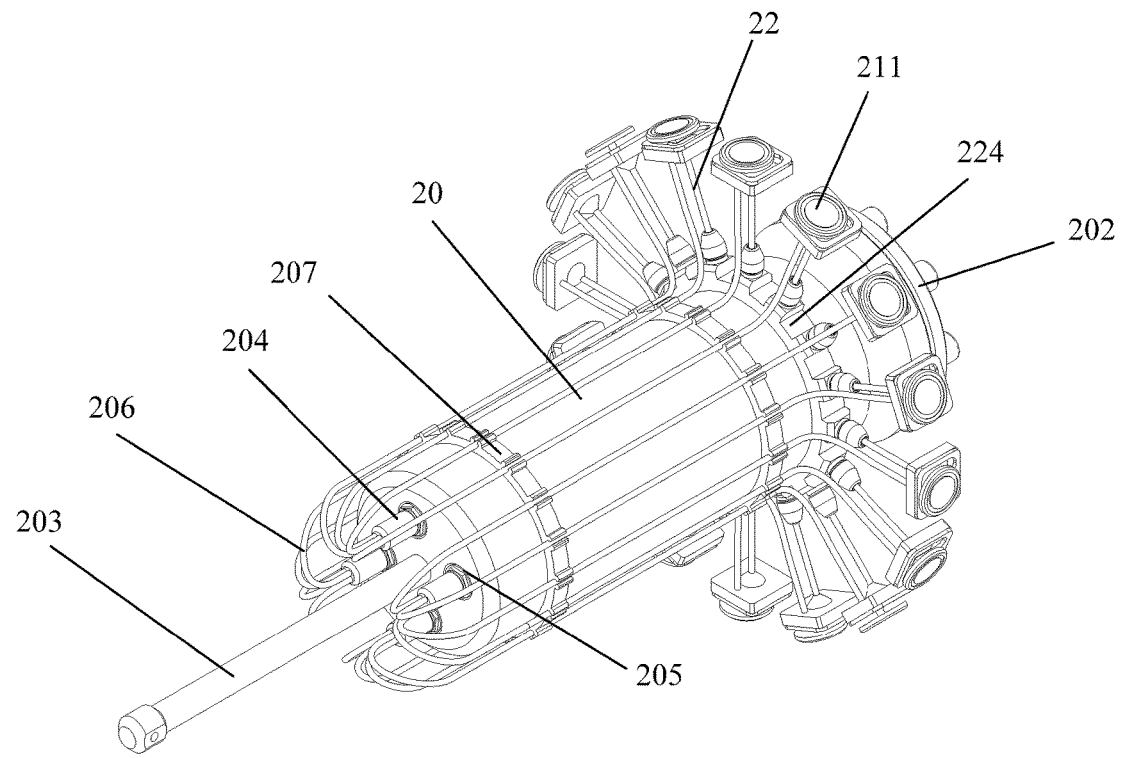
FIG. 2 is a schematic structural diagram of a detection body in FIG. 1.
Figure 3:
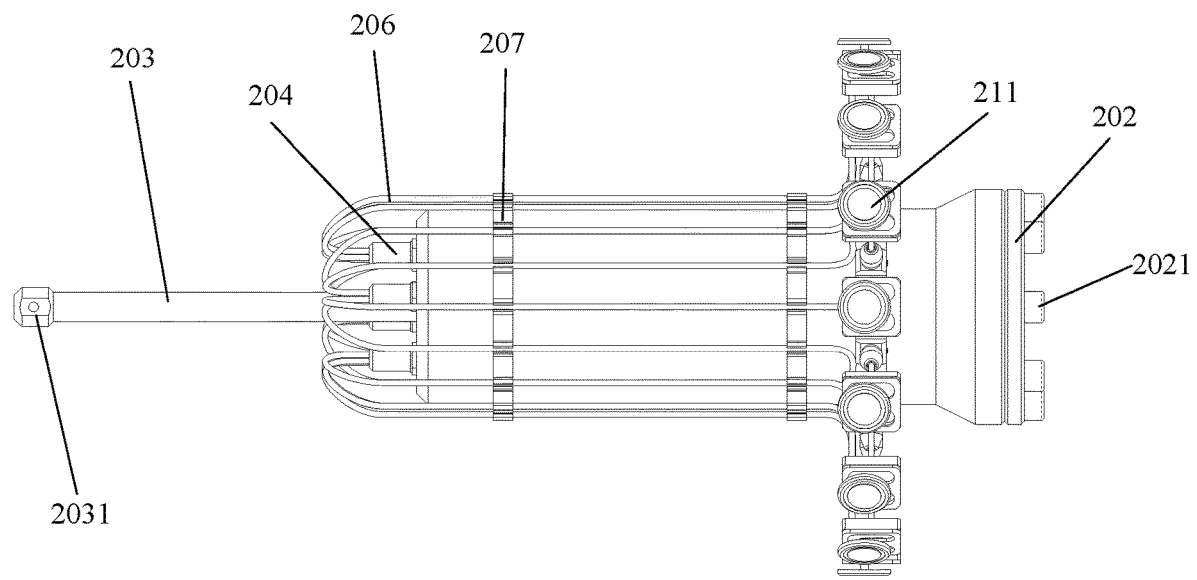
FIG. 3 is a top view of FIG. 2.
Figure 4:
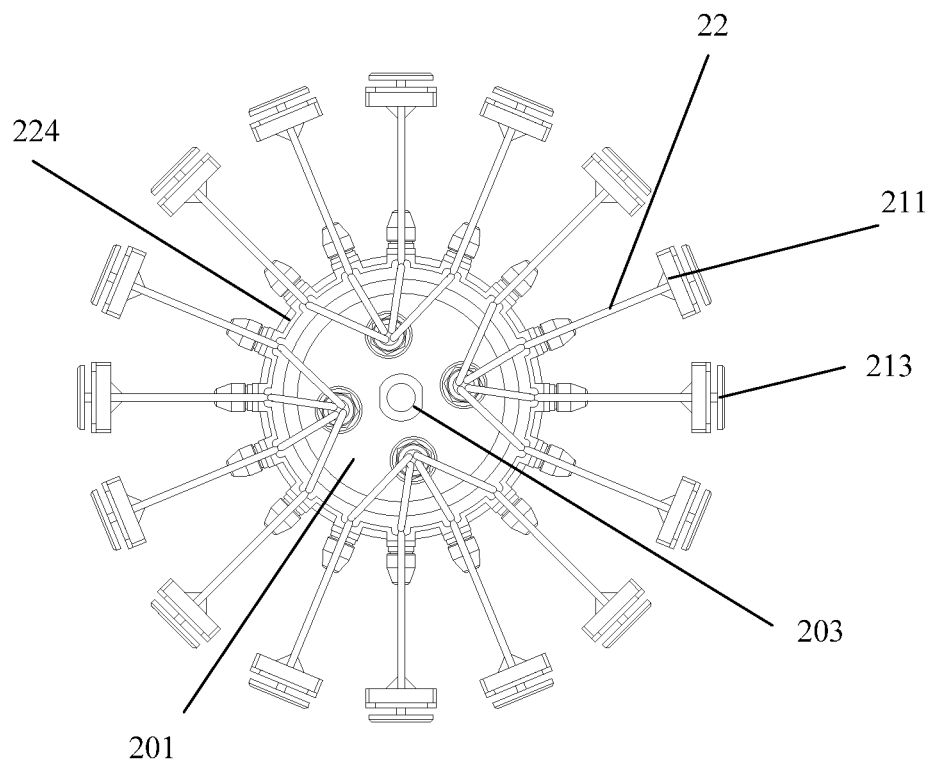
FIG. 4 is a left side view of FIG. 2.
Figure 5:
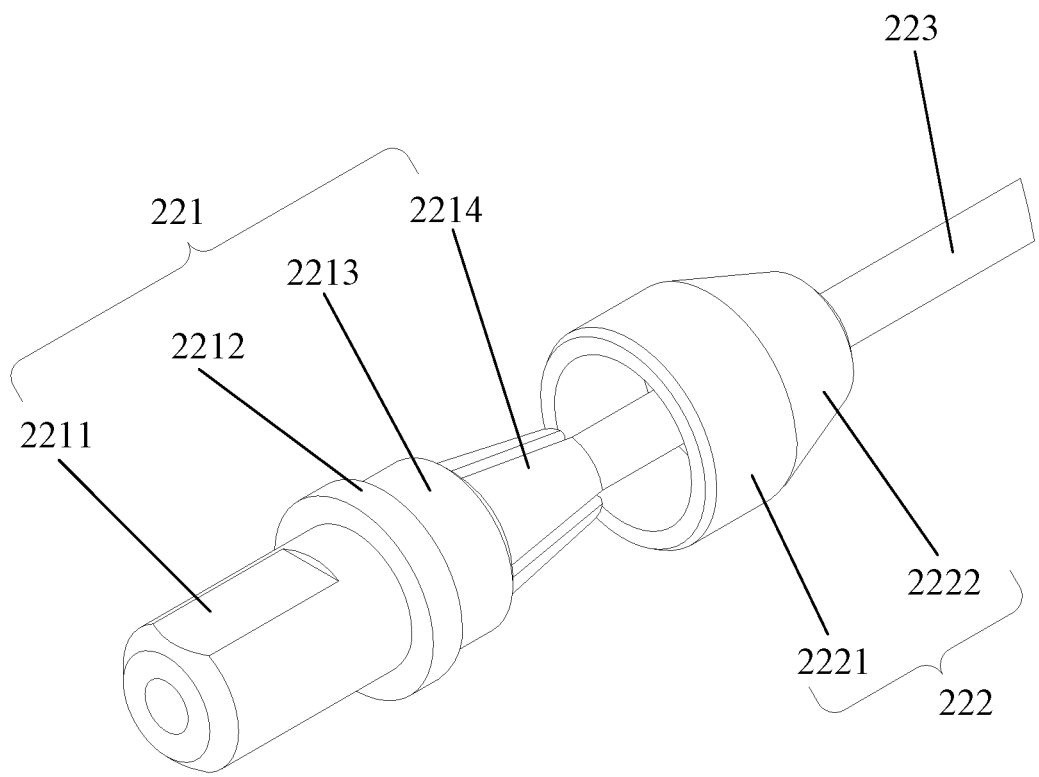
FIG. 5 is a schematic structural diagram of a support component in FIG. 2.
Figure 6:
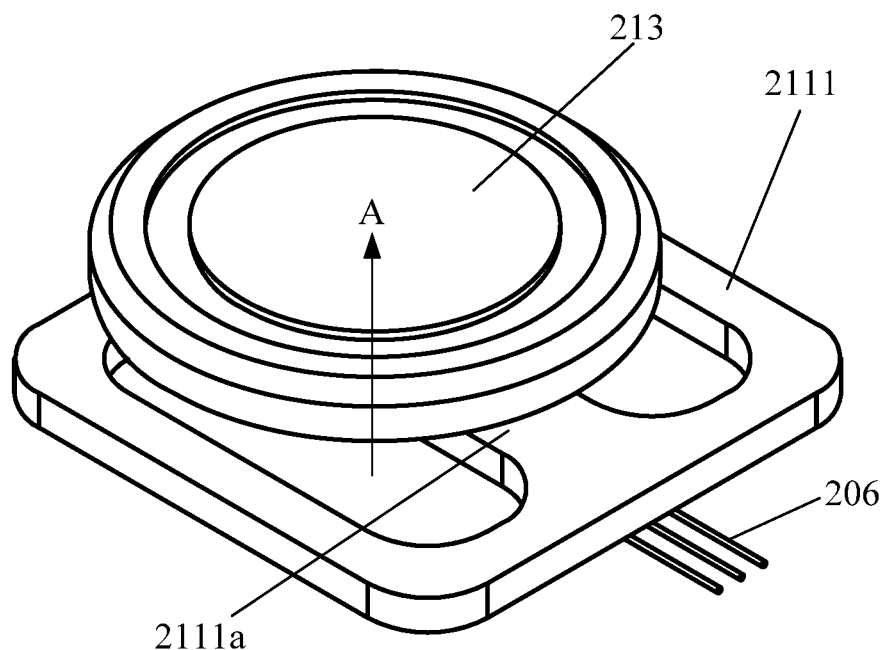
FIG. 6 is a schematic structural diagram of the pressure sensor in FIG. 2.
Figure 7:
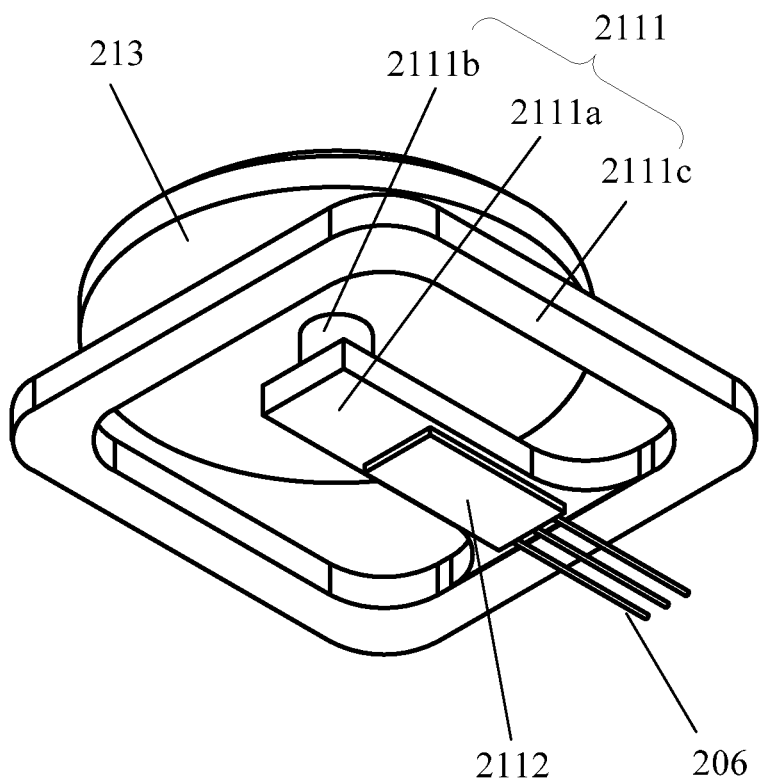
FIG. 7 is a schematic diagram of an A-direction structure of FIG. 6.
Figure 8:
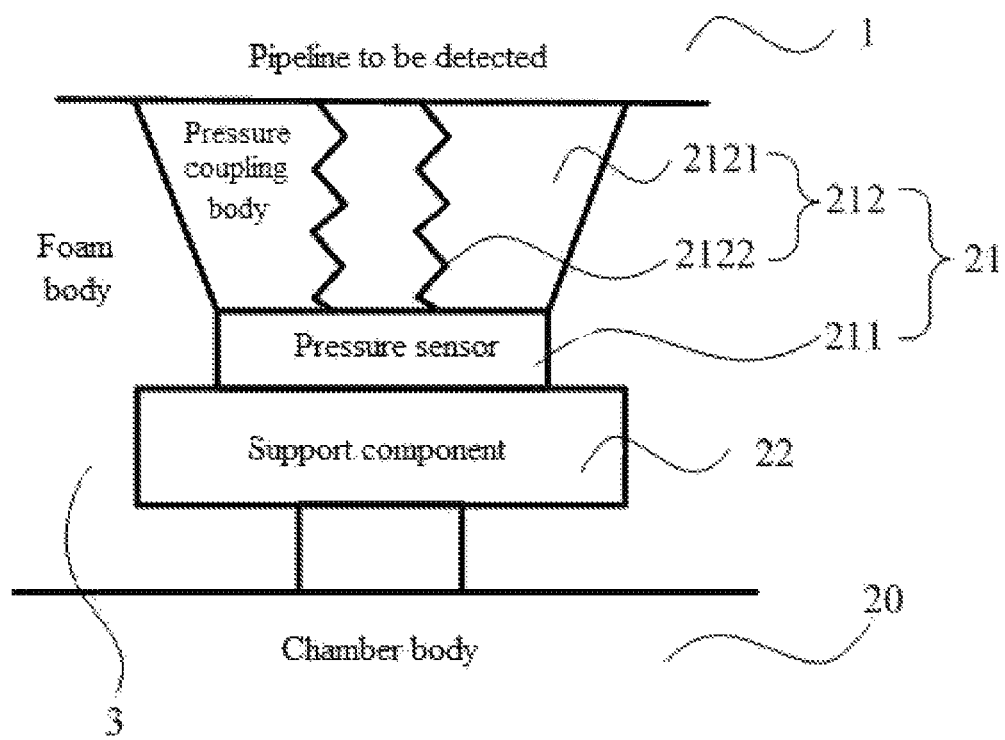
FIG. 8 is a schematic diagram of an embodiment of the pressure coupling unit in FIG. 1.
Figure 9:
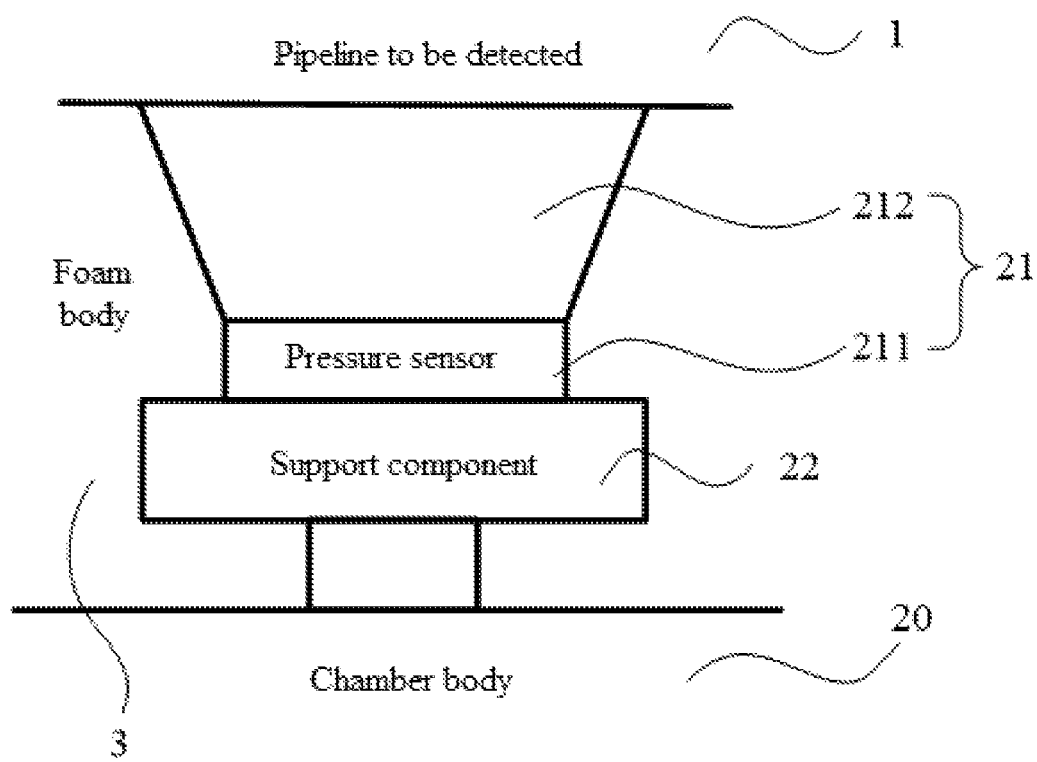
FIG. 9 is a schematic diagram of another embodiment of the pressure coupling unit in FIG. 1.

FIG. 1 is a schematic structural diagram of a pipeline deformation detection PIG according to an embodiment of the present disclosure; FIG. 2 is a schematic structural diagram of a detection body in FIG. 1; FIG. 3 is a top view of FIG. 2; FIG. 4 is a left side view of FIG. 2; FIG. 5 is a schematic structural diagram of a support component in FIG. 2; FIG. 6 is a schematic structural diagram of the pressure sensor in FIG. 2; FIG. 7 is a schematic diagram of an A-direction structure of FIG. 6; FIG. 8 is a schematic diagram of an embodiment of the pressure coupling unit in FIG. 1; FIG. 9 is a schematic diagram of another embodiment of the pressure coupling unit in FIG. 1.

Referring to FIGS. 1 to 9, the pipeline deformation detection PIG provided by the present embodiment includes: a detection body 2 and a foam body 3; the detection body 2 is arranged in the foam body 3, and the detection body 2 includes: a pressure sensing element 21; and the pressure sensing element 21 includes: a pressure sensor 211 and a pressure coupling unit 212; an inner side surface of the pressure coupling unit 212 is in contact with a force receiving surface of the pressure sensor 211, and an outer side surface of the pressure coupling unit 212 is configured to contact an inner wall of a pipeline 1 to be detected.

Specifically, the foam body 3 may be a polystyrene foam, a polyurethane foam, a polyvinyl chloride foam, or the like. In the present disclosure, a polyurethane material is preferably used for foam molding, and the degree of softness-hardness of the foam is adjusted by controlling the density after foaming, which can be designed by those skilled in the art according to the oil-gas pipeline that practically used. The foam body 3 is cylindrical, and interference fits with the inner diameter of the oil-gas pipeline 1 to secure the sealing, and to ensure that there is sufficient pressure difference between the front and back of the foam body 3, such that the PIG moves forward for detection. The foam body 3 is provided with an axial receiving cavity for receiving the detection body 2.

The detection body 2 is received in the foam body 3, and the detection body 2 includes a pressure sensing element 21. The pressure sensing element 21 includes: a pressure sensor 211 and a pressure coupling unit 212; the pressure sensor 211 may be a load cell, a piezoelectric sensor, or the like. The pressure sensor 211 can be connected to the housing body of the detection body 2 through a structure such as a support rod or a support frame. The pressure sensor 211 can also be connected to the housing body of the detection body 2 through a support rod with an adjustable length, so as to be applied for oil-gas pipelines of different thicknesses.

In some embodiments, referring to FIG. 8, the pressure coupling unit 212 includes a pressure coupling body 2121 and an elastic member 2122 arranged in the pressure coupling body 2121. The pressure coupling body 2121 is arranged on the foam body 3, and the inner side surface of the pressure coupling body 2121 is in contact with the force receiving surface of the pressure sensor 211, and the outer side surface of the pressure coupling body 2121 is configured to contact the inner wall of the pipeline 1 to be detected. The outer side surface of the pressure coupling body 2121 may directly contact the inner wall of the pipeline 1 to be detected, and the outer side surface of the pressure coupling body 2121 may also contact the inner wall of the pipeline 1 to be detected through the foam body 3. The pressure coupling body 2121 may be connected to the foam body 3 by means of bonding, snapping or the like; the pressure coupling body 2121 may also be molded with the foam body 3 through a one-step foaming process. The pressure coupling body 2121 may be conical, circular, square, elongated, or irregularly shaped. In addition, the pressure coupling body 2121 may have the same material as the foam body 3, for example, the pressure coupling body 2121 and the foam body 3 are both polyurethane materials; the pressure coupling body 2121 may be a different material from the foam body 3, for example, the pressure coupling body 2121 is a polyvinyl chloride material, and the foam body 3 is a polyurethane material. The elastic member 2122 may be an elastic member such as a spring or rubber, and the elastic member 2122 may be cylindrical, tapered, or irregularly shaped. The elastic member 2122 may be received in the pressure coupling body 2121 through a foaming process. And the deformation pressure of the pipeline can be more sensitively sensed and transmitted by the elastic member 2122.

In other embodiments, referring to FIG. 9, the pressure coupling unit 212 is an airbag, an outer wall of the airbag is in contact with the inner wall of the pipeline 1 to be detected, and an inner wall of the airbag is in contact with the force receiving surface of the pressure sensor 211. Among them, the airbag has a simple structure and is elastic in nature, and can sensitively sense and transmit pipeline deformation pressure. The gas in the airbag may be an inert gas, and the gas in the airbag may also be other gases such as air and nitrogen, which is not limited in the embodiment of the present disclosure.

The pressure sensors 211 may have a ring-shape, and may be provided in a plural number while arranged in a ring-shaped; the pressure coupling unit 212 may have a ring-shape, and may be provided in a plural number while arranged in a ring-shaped, and there is a one-to-one correspondence between the plural of pressure coupling units 212 and the plurality of pressure sensors 211.

During the detection process, the foam body 3 is in an interference fit with the pipeline 1 to be detected to achieve sealing, such that a pressure difference is generated between the front and back of the foam body 3, and the pipeline deformation detection PIG thus is moving forward. When the pressure sensing element 21 passes through the deformation area 4, after the deformation of the pipeline is sensed by the foam body 3, the deformation pressure acting on the foam body 3 by the deformation is transmitted to the pressure coupling unit 212, and the pressure coupling unit 212 further transmits the deformation pressure to the pressure sensor 211, the pressure sensor 211 detects a pressure change signal and transmits it to a subsequent data processing unit for processing. Among them, compared with the pressure transmission of only the foam body structure, the elastic member 2122 can more sensitively sense the deformation pressure of the pipeline and transmit it to the pressure sensor 211 for detection. The pressure coupling unit 212 can deform under pressure as the pipeline deforms. Even if the pipeline is deformed greatly, the pipeline deformation detection PIG provided by the embodiment of the present disclosure is not easy to be stuck, which solves the problem that the existing detection PIG is easily to be stuck in a large deformation pipeline.

In the pipeline deformation detection PIG provided by the embodiment of the present disclosure, the detection body is arranged in the foam body, the inner side surface of the pressure coupling unit is in contact with the force receiving surface of the pressure sensor, and the outer side surface of the pressure coupling unit is in contact with the inner wall of the pipeline to be detected, such that the pressure value of each radial section of the pipeline can be detected, the deformation detection of the entire circumferential direction of the pipeline can be realized. And the pressure coupling unit can deform under pressure as the pipeline deforms, which solves the problem that the existing detection PIG is easily to be stuck in a large deformation pipeline.

In order to detect the pressure value of each radial section of the pipeline, in some embodiments, plurality of pressure coupling units 212 are provided, and the plurality of pressure coupling units 212 are arranged at regular intervals along the radial section of the pipeline 1 to be detected. Specifically, a plurality of pressure coupling bodies 2121 and a plurality of elastic members 2122 are provided. One elastic member 2122 may be arranged in one pressure coupling body 2121, a plurality of elastic members 2122 may also be arranged in one pressure coupling body 2121. In this case, the pressure sensors 211 may have a ring-shape, and may be provided in a plural number while arranged at regular intervals along the radial section of the pipeline correspondingly. For example, the plurality of pressure coupling bodies 2121 are contact with the plurality of pressure sensors 211, and there is a one-to-one correspondence between the plurality of pressure coupling bodies 2121 and the plurality of pressure sensors 211, such that the deformation position of the pipeline 1 to be detected can be accurately determined.

In other embodiments, in order to more accurately detect the deformation position on the ring-shaped pipeline, the pressure coupling unit 212 is ring-shaped. Specifically, the pressure coupling body 2121 is ring-shaped, and may be provided in a plural number while arranged at regular intervals along the radial section of the pipeline, or the elastic members 2122 may be ring-shaped. At this time, the pressure sensors 211 may have a corresponding ring shape, and may be provided in a plural number while arranged at regular intervals along the radial section of the pipeline. For example, the ring-shaped pressure coupling body 2121 is provided on the foam body 3, and may be provided in a plural number while arranged at regular intervals along the radial section of the pipeline. The ring-shaped inner side surface of the pressure coupling body 2121 is in contact with the force receiving surfaces of the plurality of pressure sensors 211, and the ring-shaped outer side surface of the pressure coupling body 2121 is configured to contact the inner wall of the pipeline 1 to be detected. When there is a deformation area 4 in the pipeline 1 to be detected, the pressure changes in each radial direction of the ring-shaped pipeline can be sensed by the ring-shaped pressure coupling unit 212, and the pressure on the force receiving surface of the pressure sensor 211 also changes, so that a pressure change signal is detected, and a deformation signal of pipeline to be detected is output.

In some embodiments, the pressure coupling unit 212 is separately molded, and the pressure coupling unit 212 is fixedly connected to the foam body 3. Referring to FIG. 8, the pressure coupling unit 212 is separately molded, and the elastic member 2122 can be received in the pressure coupling body 2121 through a foaming process. The pressure coupling body 2121 may have the same material as the foam body 3 or different material from the foam body 3. The pressure coupling body 2121 can be set in a conical shape, the side face of the large circular surface is fixedly connected to the foam body 3, and the side face of the small circular surface is in contact with the pressure sensor 211; the pressure coupling body 2121 can also be cylindrical, square, elongated, or irregularly shaped. The pressure coupling body 2121 is fixedly connected to the foam body 3 and may be bonded, snapped, or the like. The contact surface between the pressure coupling unit 212 and the foam body 3 is a pressure sensing area. When the deformation area of the pipeline 1 to be detected is located in the pressure sensing area of the pressure coupling unit 212, the pressure coupling unit 212 senses the pressure and transmits it to the pressure sensor 211. The pressure sensor 211 can obviously sense a sudden change in pressure, thereby detecting a pressure change signal, and outputting a deformation signal of the pipeline to be detected, making deformation detection more sensitive.

In other embodiments, the pressure coupling unit 212 is integrally molded with the foam body 3. Specifically, the pressure coupling unit 212 and the foam body 3 are integrally molded by a foaming process. At this time, the pressure coupling body 2121 and the foam body 3 are integrally molded, which is equivalent to that the pressure sensing area of the pressure coupling unit 212 is the contact surface between the entire foam body 3 and the pipeline 1 to be detected, and all the pipeline deformations can be completely detected, including small area deformation, large area deformation. When a deformation area appears in the pipeline 1 to be detected, as the foam body 3 contacts the deformation area, the pressure sensor 211 gradually senses the pressure change and outputs a continuous pressure signal. While determining the pipeline deformation position, the size and changes in the deformation area of the pipeline can be evaluated, which are helpful for technicians to evaluate and repair the pipeline deformation.

Continuing to refer to FIG. 1 to FIG. 4, the detection body 2 further includes: a chamber body 20 and a support component 22; one end of the support component 22 is fixedly connected to the chamber body 20, and the other end of the support component 22 is used for fixing the pressure sensor 211.

The chamber body 20 may be cylindrical, cone, or the like. The chamber body 20 may be located at the axial center of the foam body 3, and coaxially with the foam body 3; or, the chamber body 20 may also be located at the axial eccentric position of the foam body 3.

In some embodiments, the support component 22 may be a support rod, one end of the support rod is fixedly connected to the chamber body 20, and the other end of the support rod is used for fixing the pressure sensor. Specifically, one end of the support rod may be directly connected to the chamber body 20 by screwing, snapping, or the like; or, a fixing structure can be arranged on the chamber body 20 for fixedly connecting one end of the support rod. The other end of the support rod may be directly fixedly connected to the pressure sensor 211, or the other end of the support rod is arranged with a mounting support for fixedly installing the pressure sensor 211.

In other embodiments, the support component 22 may be a retractable support rod with a locking function, and the support rod may be adjusted to lock at different lengths so as to be suitable for oil-gas pipelines with different inner diameters.

The detection body 2 may further include a data acquisition unit, a power source, and the data acquisition unit is communicationally connected to the pressure sensing element 21 for receiving a pressure signal detected by the pressure sensing element 21, and processing the pressure signal and storing the pressure signal in a data storage unit, centralized processing the pressure signals after detecting a section of pipeline; or, the pressure signal is processed and sent to the processing terminal for real-time monitoring and processing by a technician. The power source supplies power to the data acquisition unit and the pressure sensing element 21, and may be any type of battery. The data acquisition unit and the power source may be arranged in the receiving cavity opened in the chamber body 20, or a separate storage area may be provided.

Referring to FIGS. 6 and 7, the pressure sensor 211 includes a mounting frame 2111 and a strain gauge 2112; the mounting frame 2111 includes an indenter 2111a and a frame 2111c fixedly connected to the indenter 2111a; the frame 2111c is fixedly connected to the support component 22; one side of the indenter 2111a is connected to the strain gauge 2112, and the other side of the indenter 2111a is fixed to the support component 22.

Specifically, the pressure sensor 211 includes a mounting frame 2111 and a strain gauge 2112. The mounting frame 2111 includes an indenter 2111a and a frame 2111c. The frame 2111c may be a polygon frame such as a triangle frame, a quadrangular frame, or an irregular shape frame. In this embodiment, the frame 2111c is preferably a quadrangular frame. In order to avoid sharp edges from damaging the foam body, the corners of the frame 2111c are curved. One end of the indenter 2111a is fixedly connected to one side of the quadrangular frame, and the other end extends toward the side opposite to the side, and is in a suspended state. Preferably, the indenter 2111a and the frame 2111c are integrally molded as one piece. The support component 22 may be fixedly connected to one side of the quadrangular frame, or the support component 22 may be connected to multiple sides of the quadrangular frame. The strain gauge 2112 may be a resistive strain gauge, an inductive strain gauge, a capacitive strain gauge, and the like. In this embodiment, a resistive strain gauge is preferred.

One side of the indenter 2111a is connected to the strain gauge 2112, the other side of the indenter 2111a is configured to contact the inner side surface of the pressure coupling unit 212, and the other side of the indenter 2111a may directly contact the inner side surface of the pressure coupling unit 212. The pressure sensing element of this embodiment further includes a tray 213, one side of the tray 213 is fixed to the other side of the indenter 2111a, the other side of the tray 213 is in contact with the inner side of the pressure coupling unit 212. The tray 213 receives the deformation pressure transmitted by the pressure coupling unit 212, and then promotes the deflection of the indenter 2111a, and the pressure signal is converted into an electrical signal through the strain gauge 2112. The tray 213 may be a circular disk, an oval disk, a polygonal disk body, or an irregularly shaped disk body. In order to enhance the sensitivity of pressure transmission, the tray 213 and the strain gauge 2112 are disposed on the indenter 2111a near the suspending end.

Further, referring to FIG. 5, the support component 22 includes a cross clamp 221, a tightening nut 222, and a support frame 223; one end of the cross clamp 221 is fixedly connected to the chamber body 20, and the other end of the cross clamp 221 is connected to one end of the support frame 223. The tightening nut 222 locks the support frame 223 at a preset height and angle; the other end of the support frame 223 is fixedly connected to the frame 2111c.

Specifically, the support component 22 includes a cross clamp 221, a tightening nut 222, and a supporting frame 223. The cross clamp 221 includes a fixing portion 2211, an abutting portion 2212, an external thread portion 2213, and a clamping portion 2214. The fixing portion 2211 is used for fixed connection with the chamber body 20, and the fixing portion 2211 may be threadedly connected to the chamber body 20 or snap-connected to the chamber body 20. For example, referring to FIG. 2, the outer surface of the chamber body 20 is provided with a fixing ring 224. A snapping mechanism is provided on the fixing ring 224 and is snap-connected with the fixing portion 2211 of the cross clamp 221. The external thread portion 2213 is configured to connect with the tightening nut 222. An abutting portion 2212 is arranged between the fixing portion 2211 and the external thread portion 2213. The abutting portion 2212 is used to resist the snapping of the fixing portion 2211 and at the same time resist the connection between the external thread portion 2213 and the tightening nut 222. The clamping portion 2214 is used to clamp the support frame 223. The clamping portion 2214 may be a plurality of clamping jaws, for example, three clamping jaws, four clamping jaws, and the like. The tightening nut 222 includes an internal thread portion 2221 and a conical portion 2222. The internal thread portion 2221 is threadedly connected to the external thread portion 2213 of the cross clamp 221. The conical portion 2222 is used to gather and lock the clamping portion 2214, such that the clamping portion 2214 clamps the support frame 223. One end of the support frame 223 is locked to the cross clamp 221 by the tightening nut 222, and the other end of the support frame 223 is fixedly connected to the frame 2111c. In addition, in order to adjust the height and angle of the support frame 223, the fixing portion 2211, the abutting portion 2212, and the external thread portion 2213 of the cross clamp 221 are provided with through holes. One end of the support frame 223 that passing through the through hole of the tightening nut 222 successively passes through the clamping portion 2214 and the through hole of the cross clamp 221, and adjusts the height of the support frame 223 by adjusting the length of one end of the support frame 223 inserting into the through hole, adjusts the angle of the support frame 223 by adjusting the angle at which the support frame 223 is clamped by the clamping portion 2214, the tightening nut 222 fixes the support frame 223 at a preset height and angle through the screw connection of the internal thread portion 2221 and the external thread portion 2213 of the cross chuck 221, and the cooperation of the conical portion 2222 and the clamping portion 2214, so as to apply to the deformation detection of oil-gas pipelines with different inner wall diameters, improving the generality.

On the basis of the above embodiment, in order to reduce the resistance of the pipeline deformation detection PIG to move forward, one end of the foam body 3 is molded into a cone shape, and the pressure sensing element 21 is disposed at an end away from the cone shaped end. Specifically, referring to FIG. 1, one end of the foam body 3 is molded into a cone shape so as to reduce the resistance of the pipeline deformation detection PIG to move forward. The present disclosure does not specifically limit the conicity of the cone. The other end of the foam body 3 is cylindrical and interference fits with the inner diameter of the oil and gas pipeline 1 to secure sealing, and to ensure that there is sufficient pressure difference between the front and back of the foam body 3, such that the PIG can be moved forward for detection. The pressure sensing element 21 is disposed at an end away from the cone shaped end so as to detect the pressure value of each radial section of the pipeline 1 to be detected.

Of course, in order to set the initial pressure value of the pressure sensing element 21 simply and quickly, in this embodiment, it is preferable that the chamber body 20 and the foam body 3 are coaxial.

Furthermore, the chamber body 20 in this embodiment includes: an outer housing body 201 and a bottom cover 202 in sealing connection with the outer housing body 201; a data acquisition element communicationally connected to the pressure sensing element 21 is arranged in a receiving cavity of the outer housing body 201.

Specifically, the outer housing body 201 is cylindrical tubular, and the open end is sealed by the bottom cover 202. The outer housing body 201 and the bottom cover 202 may be sealed in the form of an end face seal, and a closed cavity is formed by the connection of a flange bolt 2021. The outer housing body 201 and the bottom cover 202 may also be connected in the form of a screw connection to form a closed cavity. The sealing form of the outer housing body and the bottom cover is not specifically limited in the present disclosure. The bottom cover 202 can be flush with the end surface of the other end of the foam body 3, that is, the bottom cover 202 is located outside the foam body 3, which facilitates the removal of the bottom cover.

A data acquisition element is further provided in the closed receiving cavity of the outer housing body 201, and is communicationally connected to the pressure sensing element 21 via a wire 206. The bottom wall of the end of the outer housing body 201 away from the bottom cover 202 is provided with a wire hole, through which the wire passes and connects the pressure sensing element 21. To ensure sealing, the bottom wall of the outer housing body 201 is provided with a sealing joint 205, one end of the sealing joint 205 is connected to the bottom wall, and the other end is connected with a sealing rubber sleeve 204, which also guides the wire 206 while sealing. Further, a snap ring 207 is provided on an outer side wall of the chamber body 20 for snap fixing a wire. One snap ring 207 may be provided, for example, at the axial center of the chamber body 20, and multiple snap ring 207 may be provided at intervals along the axial direction of the chamber body 20, for example, two snap rings 207 are respectively provided at both ends of the chamber body 20.

A data storage unit may also be provided in the closed receiving cavity, which is communicationally connected with the data acquisition element for storing the collected data; or a data transmission unit may be provided in the closed receiving cavity for transmitting the collected data to the ground handling terminal in real time. Naturally, a power source will be provided in the closed receiving cavity to provide power for the data acquisition elements and the pressure sensing elements.

In addition, the chamber body 20 may further include a pull rod 203. One end of the pull rod 203 is fixedly connected to the bottom wall of the chamber body 20, which may be a screw connection, a snap connection, and the like, and the other end is provided with a mounting portion 2031 for connecting a carrier, a hoist, etc., so as to facilitate the handling, hoisting, and traction test of the PIG.

Finally, it should be noted that the above embodiments are only used to illustrate the technical solution of the present disclosure, but not limited thereto. Although the present disclosure has been described in detail with reference to the foregoing embodiments, those skilled in the art should understand that it is still possible to modify the technical solutions described in the foregoing embodiments, or to substitute some or all of the technical features equivalently; and such modifications or substitutions do not deviate the nature of the technical solution from the scope of the technical solution in the embodiments of the present disclosure.

What is claimed is:

1. A pipeline deformation detection PIG, comprising: a detection body and a foam body; the detection body is arranged in the foam body, and the detection body comprises: a pressure sensing element; and the pressure sensing element comprises: a pressure sensor and a pressure coupling unit; an inner side surface of the pressure coupling unit is in contact with a force receiving surface of the pressure sensor, and an outer side surface of the pressure coupling unit is configured to contact an inner wall of a pipeline to be detected.

2. The pipeline deformation detection PIG according to claim 1, wherein the pressure coupling unit is an air bag.

3. The pipeline deformation detection PIG according to claim 1, wherein the pressure coupling unit comprises a pressure coupling body and an elastic member arranged in the pressure coupling body; the pressure coupling body is arranged on the foam body, and the inner side surface of the pressure coupling body is in contact with the force receiving surface of the pressure sensor, and the outer side surface of the pressure coupling body is configured to contact the inner wall of the pipeline to be detected.

4. The pipeline deformation detection PIG according to claim 3, wherein the pressure coupling unit is separately molded, and the pressure coupling body is fixedly connected to the foam body;
   or, the pressure coupling unit is integrally molded with the foam body.

5. The pipeline deformation detection PIG according to claim 1, wherein the detection body further comprises: a chamber body and a support component; one end of the support component is fixedly connected to the chamber body, and the other end of the support component is used to fix the pressure sensor.

6. The pipeline deformation detection PIG according to claim 5, wherein the pressure sensor comprises a mounting frame and a strain gauge; the mounting frame comprises an indenter and a frame fixedly connected to the indenter; the frame is fixedly connected to the support component; one side of the indenter is connected to the strain gauge, and the other side of the indenter is used to contact the inner side of the pressure coupling unit.

7. The pipeline deformation detection PIG according to claim 6, wherein the support assembly comprises a cross clamp, a tightening nut, and a support frame;
   one end of the cross clamp is fixedly connected to the chamber body, and the other end of the cross clamp is connected to the support frame; the tightening nut locks the support frame at a preset height and angle; the other end of the support frame is fixedly connected to the frame.

8. The pipeline deformation detection PIG according to claim 1, wherein one end of the foam body is formed as a cone shaped end, and the pressure sensing element is disposed at an end away from the cone shaped end.

9. The pipeline deformation detection PIG according to claim 5, wherein the chamber body is coaxial with the foam body.

10. The pipeline deformation detection PIG according to claim 5, wherein the chamber body comprises: an outer housing body and a bottom cover that is in sealing connection with the outer housing body; a data acquisition element communicationally connected with the pressure sensing element is arranged in a receiving cavity of the outer housing body.

* * * * *